(12) United States Patent
Son et al.

(10) Patent No.: US 8,012,636 B2
(45) Date of Patent: Sep. 6, 2011

(54) APPARATUS AND METHOD FOR ACCELERATIVELY ACTIVATING FUEL CELL

(75) Inventors: Ik Jae Son, Gyeonggi-do (KR); Jae Jun Ko, Gyeonggi-do (KR); Jong Jin Yoon, Seoul (KR); Jong Hyun Lee, Gyeonggi-do (KR); Seung Chan Oh, Gyeonggi-do (KR); Young Min Kim, Gyeonggi-do (KR); Seung Eul Yoo, Seoul (KR); Myong Hwan Kim, Chungcheongnam-do (KR); Young Mo Goo, Chungcheongnam-do (KR)

(73) Assignees: Hyundai Motor Company, Seoul (KR); Korea Automotive Technology Insitute, Cheonan, Chungcheongnam-do (KR)

( * ) Notice: Subject to any disclaimer, the term of this patent is extended or adjusted under 35 U.S.C. 154(b) by 755 days.

(21) Appl. No.: 11/985,703

(22) Filed: Nov. 16, 2007

(65) Prior Publication Data
US 2010/0167141 A1    Jul. 1, 2010

(30) Foreign Application Priority Data
Jul. 3, 2007  (KR) ................. 10-2007-0066428

(51) Int. Cl.
*H01M 8/04* (2006.01)

(52) U.S. Cl. ..................................... 429/429
(58) Field of Classification Search ............. 429/429
See application file for complete search history.

(56) References Cited

U.S. PATENT DOCUMENTS

| 5,731,097 A | 3/1998 | Miyashita et al. |
| 7,569,296 B2* | 8/2009 | Okazaki ............. 429/532 |
| 2007/0065711 A1 | 3/2007 | Gopal |
| 2007/0092772 A1* | 4/2007 | Nishimura et al. ....... 429/23 |

FOREIGN PATENT DOCUMENTS

| JP | 06-196187 | 7/1994 |
| JP | 2004-006416 | 1/2004 |
| JP | 2004-349050 A | 12/2004 |
| JP | 2004349050 A * | 12/2004 |
| JP | 2005-293936 | 10/2005 |
| KR | 10-2000-0001248 | 1/2000 |

* cited by examiner

*Primary Examiner* — Karie O'Neill Apicella
(74) *Attorney, Agent, or Firm* — Edwards Angell Palmer & Dodge LLP; Peter F. Corless

(57) ABSTRACT

Apparatuses and methods for accelerated activation of fuel cells are disclosed. The apparatuses include a fuel cell stack; an air supplying means coupled to a cathode catalyst side of the fuel cell stack through a mass flow controller and a humidifier; a hydrogen supplying means coupled to an anode catalyst side of the fuel cell stack through a mass flow controller and a humidifier; and a cable coupled to both ends of the fuel cell stack for short-circuiting the cathode and the anode.

7 Claims, 5 Drawing Sheets

APPARATUS AND METHOD FOR ACCELERATIVELY ACTIVATING FUEL CELL

CROSS-REFERENCE TO RELATED APPLICATION

This application claims the benefit under 35 U.S.C. §119(a) on Korean Patent Application No. 10-2007-0066428 filed on Jul. 3, 2007, the entire contents of which are incorporated herein by reference.

BACKGROUND

1. Technical Field

The present invention relates to apparatuses and methods for accelerated activation of a fuel cell, which can stably and rapidly secure a high stack performance while significantly improving performance of a polymer electrolyte membrane fuel cell, minimize hydrogen usage for the activation, and simplify the structure of the apparatus.

2. Background Art

A polymer electrolyte membrane fuel cell has excellent efficiency, high current density, high output density, short start-up time, and a fast response characteristic to a load variation, in comparison with other types of fuel cells, Particularly, a polymer electrolyte membrane fuel cell is less sensitive to a pressures variation of reactant gas and has the output of various ranges. For these merits, a polymer electrolyte membrane fuel cell has been employed in various industrial fields as power sources of, for example, a zero emission vehicle, a private power station, a military purpose, and so on.

A polymer electrolyte membrane fuel cell generates water and heat through an electrochemical reaction between hydrogen and oxygen. Supplied hydrogen is decomposed into a hydrogen ion and an electron by a catalyst in an anode. The decomposed hydrogen ion is transferred to a cathode through an electrolyte membrane.

At this time, oxygen supplied to a cathode is combined with the electron transferred to a cathode through an external conductive wire to thereby generate electronic energy while generating water. In this case, an ideal electrical potential is about 1.3V, and it can be expressed as a following chemical reaction equation:

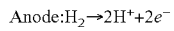

Anode: $H_2 \rightarrow 2H^+ + 2e^-$

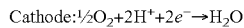

Cathode: $\frac{1}{2}O_2 + 2H^+ + 2e^- \rightarrow H_2O$

Heat generated in a unit cell due to the electrochemical reaction can be expressed by the following formula:

$Q = I \times (1.23 - V)$ where Q denotes a generated calorific value, I denotes an electric current capacity, and V denotes an average of generated voltages.

To obtain an electrical potential necessary for a vehicle, individual unit cells have to be stacked together until a desired electrical potential is achieved. The unit of stacked cells is referred to as a stack (i.e., fuel cell stack). FIG. 1 shows a configuration of a fuel cell stack.

The fuel cell stack of FIG. 1 is manufactured such that unit cells are assembled with a current collecting plate 104, an insulating plate 105, and a coupling plate 106 having a high voltage terminal 107 by using a coupling band 108 and a bolt 109. Here, the unit cell comprises a membrane electrode assembly (MEA) 100 which includes an electrolyte membrane for transferring hydrogen protons and catalyst layers (cathode and anode) coated on both sides of the electrolyte membrane so that hydrogen and oxygen can react, a gas diffusion layer (GDL) 102, and a separator 103 for supplying fuel and draining water generated by an electrochemical reaction between hydrogen and oxygen.

In the fuel cell stack essentially having the above-described configuration, hydrogen is supplied to an anode, and air or oxygen is supplied to a cathode, so that an electrochemical reaction occurs therein, generating electrical energy of high efficiency and water. That is, an electrochemical reaction happens due to the reactant gases in the catalyst layer of the fuel cell, and hydrogen ions generated move through an electrolyte in the catalyst layer and the electrolyte membrane, and electrons move into an electricity generating device through the catalyst, the gas diffusion layer, and the separator.

Particularly, hydrogen ions which move through the electrolyte or the electrolyte membrane moves through water which exists in the electrolyte membrane, and so the electrolyte in the catalyst layer and the electrolyte membrane must be sufficiently hydrated in order for the fuel cell to have better performance, and the reactant gases must smoothly arrive at the catalyst layer for the electrochemical reaction.

In such a fuel cell stack, electrodes such as a cathode and an anode are catalyst layers made by combining a hydrogen ion carrier such as nafion with a catalyst such as platinum. Such a fuel cell stack may become less activated due to an electrochemical reaction which occurs at an initial driving stage of a manufactured fuel cell. The reasons are as follows.

Firstly, a reactant cannot reach a catalyst since a reactant passage is blocked.

Secondly, a hydrogen ion carrier such as nafion, which forms a triple phase interface with a catalyst, is not easily hydrated at an initial driving stage.

Lastly, continuous mobility of hydrogen ions and electrons is not ensured.

For these reasons, an activation process is required so as to ensure a performance of a fuel cell to the maximum extent after a fuel cell is assembled.

The purpose of an activation process, which is also known as a pre-conditioning process or a break-in process, is to activate a non-reactive catalyst and to sufficiently hydrate an electrolyte contained in an electrolyte membrane and an electrode, thereby ensuring a hydrogen ion passage.

An activation process is carried out to make a fuel cell reach its maximum performance after a fuel cell is assembled. This may take a number of hours or days based on a driving condition. For example, due to an improper activation process, a fuel cell may be driven in a state that it does not reach at its maximum performance.

As described above, an improper activation process reduces a throughput of a fuel cell and increases hydrogen usage, thereby increasing a stacking cost and degrading a stack performance.

Fuel cell manufacturers have proposed methods of activating a fuel cell. A typical activation method is to drive a fuel cell for a long time under a specific voltage.

For example, an activation method of a solid polymer fuel cell is disclosed in Japanese Patent Application No. 2003-143126, assigned to AISIN SEIKI Co. Ltd. According to Japanese Patent application No. 2003-143126, a fuel cell stack is exposed to a low voltage for a long time, so that even a portion where its stack performance is no longer improved is activated. In this instance, however, there is a disadvantage in that it takes a long time for a fuel cell to reach its maximum performance even though an activation process is simple.

As another conventional method, a method of activating a polymer electrolyte membrane fuel cell using a step-voltage driving is disclosed in Korean Patent Application No. 2005-0120743, assigned to an assignee of the present invention. According to Korean Patent Application No. 2005-0120743, a voltage cycle of from an open circuit voltage (OCV) (1 minute) to 0.4 volt (5 minutes) is applied to a stack at a high driving temperature (70° C.) and at relative humidity (RH) of 100% (see FIG. 3), thereby reducing an activation time of a fuel cell to within about 3 hours. In this case, however, there is a problem in that if a time to obtain a maximum output after a stack is manufactured is lengthy, time efficiency can be lowered, which will reduce and price competitiveness can be lowered since hydrogen and oxygen are excessively consumed while driving.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to solve the aforementioned problems associated with prior arts. One object of the present invention is to provide apparatuses and methods for accelerated activation of a fuel cell, in which a high stack performance is stably rapidly secured while significantly improving a performance of a polymer electrolyte membrane fuel cell. Another object of the present invention is to provide apparatuses and methods for accelerated activation of a fuel cell, which can minimize hydrogen usage for the activation process. Still another object of the present invention is to provide activating apparatuses having simplified configuration.

In one aspect, the present invention provides an apparatus for accelerated activation of a fuel cell, comprising: a fuel cell stack; an air supplying means coupled to a cathode catalyst side of the fuel cell stack through a mass flow controller and a humidifier; a hydrogen supplying means coupled to an anode catalyst side of the fuel cell stack through a mass flow controller and a humidifier; a thermostat for circulating cooling water to be supplied to the fuel cell stack; and a cable coupled to both ends of the fuel cell stack for short-circuiting the cathode and the anode.

In another aspect, the present invention provides an apparatus for accelerated activation of a fuel cell, comprising: a fuel cell stack; an air supplying means coupled to a cathode catalyst side of the fuel cell stack through a mass flow controller and a humidifier; a hydrogen recirculating blower coupled to a hydrogen outlet side of the fuel cell stack; a hydrogen supplying means coupled to an anode catalyst side of the fuel cell stack through a low pressure regulator; a hydrogen purge valve coupled to a hydrogen channel of the fuel cell stack to drain water accumulated in the hydrogen channel; a thermostat for circulating cooling to be supplied to the fuel cell stack; and a cable coupled to both ends of the fuel cell stack for short-circuiting the cathode and the anode.

In a further aspect, the present invention provides a method for acceleratively activating a fuel cell, comprising the steps of: (a) mounting a fuel cell stack onto an activating apparatus; (b) coupling a cable to both ends of the fuel cell stack to short-circuit a cathode and an anode; (c) supplying reactant gas while circulating cooling water to the fuel cell stack to thereby start to activate the fuel cell stack; and (d) adjusting a flow rate of the reactant gas supplied to the fuel cell stack.

In a preferred embodiment, in the step (c), when the cathode and the anode are short-circuited by the cable, a current value of the cable depends on a flow rate of the reactant gas (hydrogen and oxygen) and means a maximum current value of the stack, wherein a stack voltage has around 0 volt.

In another preferred embodiment, in the step (c), when the stack voltage drops to around 0 volt, a stack calorific value has a maximum value, and so cooling water is supplied from a thermostat to the stack.

In still another preferred embodiment, in the step (d), the reactant gas is repetitively supplied with a low flow rate to a high flow rate which is determined based on electrical current density.

In yet another preferred embodiment, the method may further comprise, after the activation of the fuel cell starts, if a certain cell voltage decreases gradually and a time having a reverse voltage of lower than 0 volt lasts during more than a reference time, the step of adjusting a time for a low flow rate and a time for a high flow rate to thereby reduce the time having a reverse voltage to a time within the reference time.

In a further preferred embodiment, the method may further comprise, if a reverse voltage is generated by an oxygen starvation after the activation of the fuel cell starts, the step of adjusting a load while reducing an air flow rate to thereby maintain a cell voltage at higher than 0 volt.

In a yet further preferred embodiment, the method may further comprise, after the activation of the fuel cell starts, the step of mixing dry hydrogen gas supplied from a hydrogen supplying means and water drained to a hydrogen outlet side of the fuel cell stack by using a recirculating blower before supplying to the fuel cell stack.

In a still further preferred embodiment, the method may further comprise periodically draining water accumulated in a hydrogen channel of the fuel cell stack through a hydrogen purge valve.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like. The present apparatuses and methods will be particularly useful with a wide variety of motor vehicles.

Other aspects of the invention are discussed infra.

BRIEF DESCRIPTION OF THE DRAWINGS

The above and other features of the present invention will be described in reference to certain exemplary embodiments thereof with reference to the attached drawings in which.

DETAILED DESCRIPTION

Figure 1:
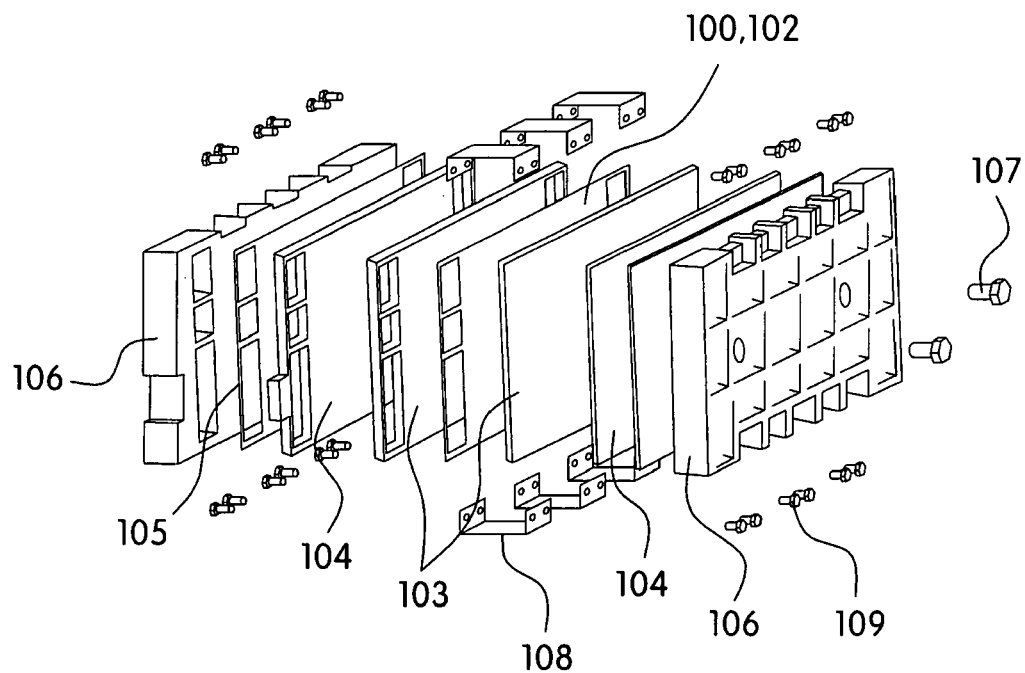
FIG. 1 is a perspective view illustrating a typical fuel cell stack.

Reference will now be made in detail to the embodiments of the present invention, examples of which are illustrated in the accompanying drawings, wherein like reference numerals refer to the like elements throughout. The embodiments are described below in order to explain the present invention by referring to the figures.

According to the embodiments of the present invention, a cathode and an anode of a fuel cell stack are short-circuited, and then an accelerative activation process is repetitively performed, whereby an accelerative activation process for improving the performance of a fuel cell can be rapidly completed (within about 30 minutes).

Figure 2:
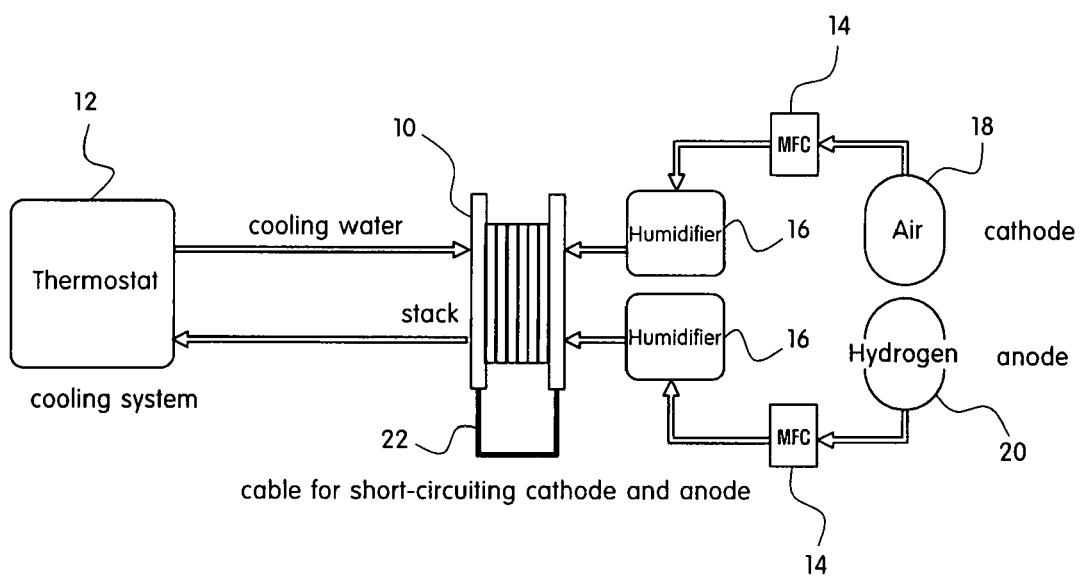
FIG. 2 is a block diagram illustrating a fuel cell activating apparatus according to one exemplary embodiment of the present invention.
Figure 3:
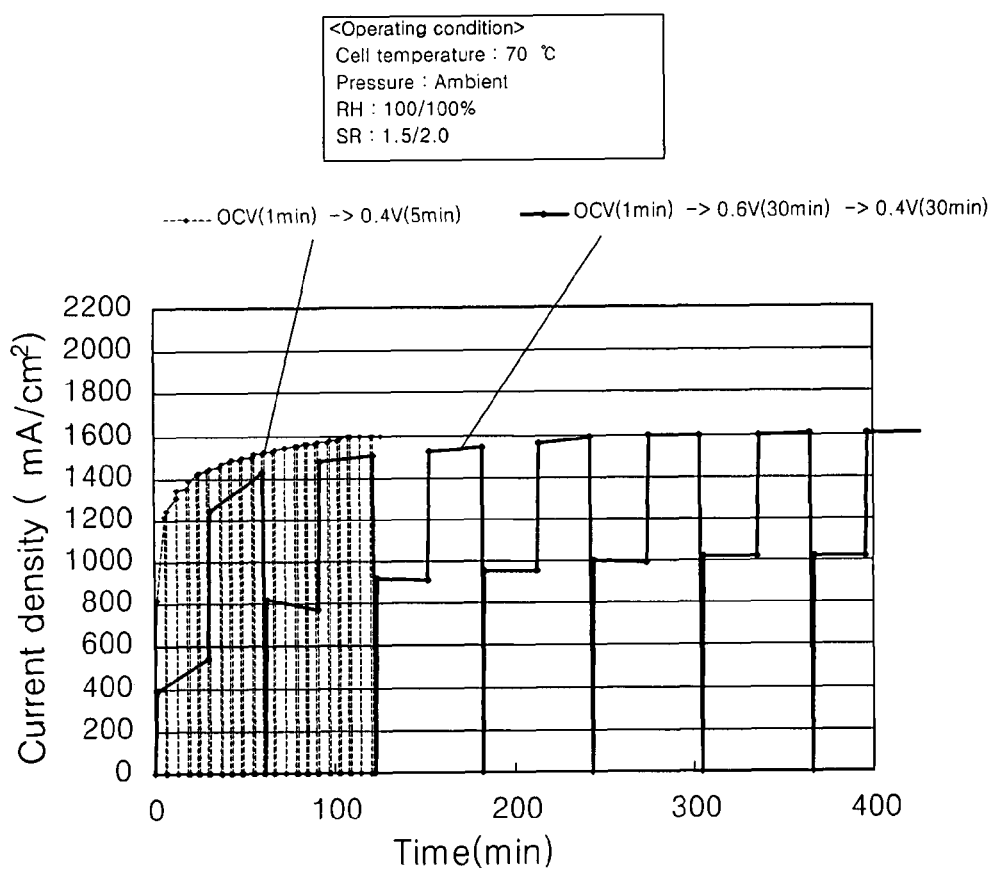
FIG. 3 is a graph illustrating a conventional fuel cell activating method.

In one aspect, as discussed above, the present invention provides an apparatus for acceleratively activating a fuel cell, comprising: a fuel cell stack; an air supplying means coupled to a cathode catalyst side of the fuel cell stack through a mass flow controller and a humidifier; a hydrogen supplying means coupled to an anode catalyst side of the fuel cell stack through a mass flow controller and a humidifier; and a cable coupled to both ends of the fuel cell stack for short-circuiting the cathode and the anode. Referring to FIG. 2, a method for acceleratively activating a fuel cell according to one exemplary embodiment of the present invention is described below.

First, a fuel cell stack 10 is mounted onto the activating apparatus.

Next, the fuel cell stack 10 is coupled to a gas pipe of the activating apparatus for gas supplying and is coupled to a thermostat 12 for stack cooling. An anode catalyst side of the fuel cell stack 10 is coupled to a hydrogen supplying means 20 through a mass flow controller (MFC) 14 and a humidifier 16, and a cathode catalyst side of the fuel cell stack 10 is coupled to an air supplying means 18 through the mass flow controller 14 and the humidifier 16. A cable 22 is connected to both stack ends for short-circuiting the cathode and the anode of the fuel cell stack 10.

Subsequently, reactant gas is supplied while circulating cooling water to an inside of the fuel cell stack 10 to thereby start accelerative activation of the fuel cell.

That is, since the polymer electrolyte membrane fuel cell generates water and electrical energy created by electrochemical reaction between hydrogen and oxygen, supplied hydrogen is decomposed into hydrogen ions and electrons by the catalyst in the anode, and the decomposed hydrogen ions are transferred to the cathode through the electrolyte membrane.

At this time, since the cathode and the anode are short-circuited, an electrical current value in the cable 22 for short-circuiting the cathode and the anode depends on a flow rate of the reactant gas (hydrogen and air) and means a maximum electrical current value of the stack. Meanwhile, a stack voltage maintains at around 0 volt.

If the stack voltage drops to around 0 volt, a stack calorific value has a maximum value according to the mathematical formula described above.

In more detail, if the stack voltage has around 0 volt when the fuel cell stack is acceleratively activated, a stack calorific value becomes a value near a maximum value. If a cooling system during stack activation is not provided, a stack driving temperature may be steeply raised by more than tens of degrees due to a calorific value of a stack itself, resulting in damaging the fuel cell which is being driven. For this reason, necessary is a cooling system for maintaining a stack driving temperature during the accelerative activation according to the present invention.

To this end, in order to maintain the stack driving temperate by using a cooling system, cooling water is supplied to be circulated from the thermostat 12 to the stack 10 and returned.

Lastly, a flow rate of the reactant gas is adjusted.

The reactant gas is supplied based on an electrical current density, and this value is changeable.

Figure 4:
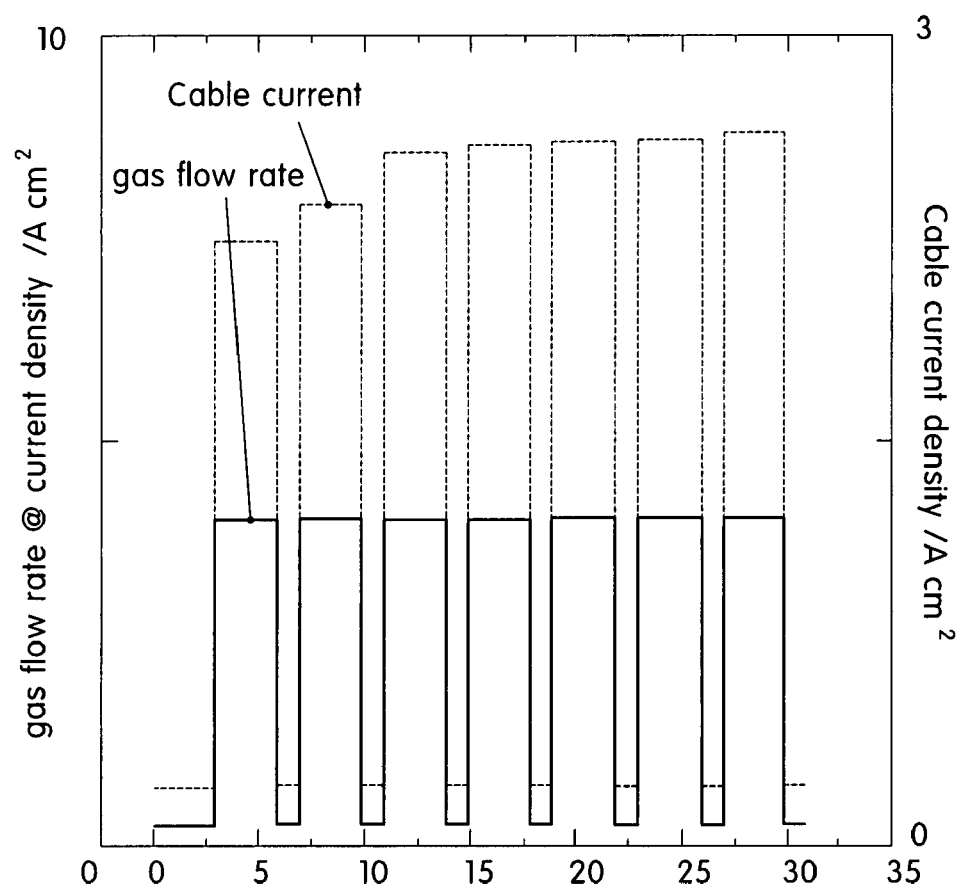
FIG. 4 is a graph illustrating a method for acceleratively activating a fuel cell according to the exemplary embodiment of the present invention in which a flow rate of reactant gas is adjusted based on electrical current density.

For example, if a gas flow rate is adjusted from a low flow rate (during one minute) to a high flow rate (during three minutes) based on the current density, as shown in a graph of FIG. 4, it can be repetitively performed, e.g., seven times (within about 30 minutes) before finishing the activation process.

The reason for supplying the reactant gas at a low flow rate is to stabilize the stack at an initial activation stage and to prevent the electrolyte membrane and the catalyst layer from being partially damaged due to a high stack calorific value.

On the other hand, the reason for supplying the reactant gas at a high flow rate is to induce the reaction within the stack to be performed with full capacity so as to rapidly activate the electrolyte membrane and the catalyst layer, to prevent the gas from locally lacking in a reacting area during the to electrochemical reaction and to secure a reaction channel of the reactant.

To this end, if gas is supplied at a stoichiometric ratio of 2.0/2.0 with a maximum current value during the accelerative activation, it is the most stable flow rate. A large amount of water generated by the electrochemical reaction can be easily drained by an excessive amount of gas supplied at the 2.0/2.0 stoichiometric ratio, so that a passage of the reactant gas can be readily secured and a hydration state of the fuel cell can be maintained.

Meanwhile, when the fuel cell stack is acceleratively activated by the above-described three-step activation process according to the present invention, each cell voltage of the stack may partially have a reverse voltage since the cathode and the anode are short-circuited.

It is known to a person having ordinary skill in the art that when a cell is under around −0.8 volt for 20 minutes, it does not affect a cell performance. However, in order for a voltage of a certain cell to have a reverse voltage of lower than 0 volt, it is necessary to reduce a driving cycle period for stable cell activation.

Embodiments of the present invention provide two methods for preventing occurrence of reverse voltage.

Firstly, if after activation of the fuel cell starts, a certain cell voltage gradually decreases and a time for having a reverse voltage of lower than 0 volt lasts for more than 30 seconds which is a reference time, a cycle period is changed to perform an activation process in which a time having a reverse voltage is reduced to within 30 seconds. For example, a time having a reverse voltage can be reduced to within 30 seconds such that a time for a low flow rate is adjusted to be reduced to 30 seconds and a time for a high flow rate is adjusted to be reduced to one minute.

Secondly, a reverse voltage can be prevented by reduction of flow rate and adjustment of a load. Specifically, a reverse voltage may be generated by a fuel starvation during activation, in which a carbon support of an air side electrode can be corroded. In order to prevent the air side electrode from being corroded, for example, a load can be adjusted while reducing an air flow rate to maintain a cell voltage at higher than 0 volt.

Figure 5:
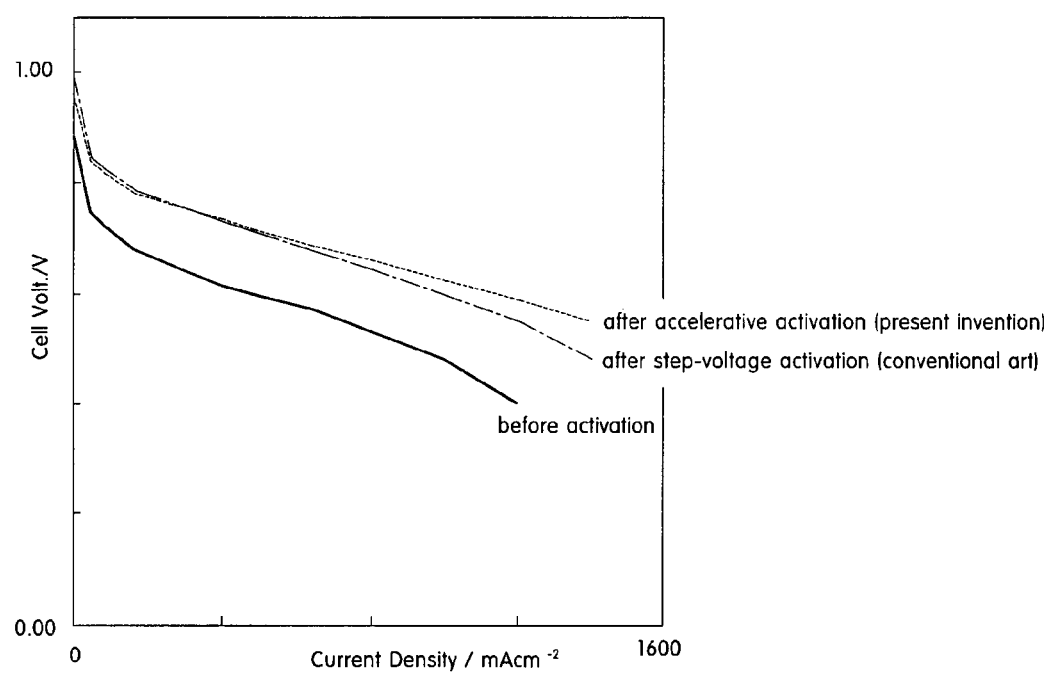
FIG. 5 is a graph illustrating a result of comparing the performance of the conventional fuel cell activating method and the inventive fuel cell activating method.

As shown in a graph of FIG. 5, the conventional activation method disclosed in Korean Patent Application No. 2005-

120743 and the method according to the embodiment of the present invention has a similar performance, but the present method has superior stack performance in a high current density region compared with the conventional method.

As discussed above, in another aspect, the present invention provides an apparatus for acceleratively activating a fuel cell, which includes a hydrogen recirculating blower and a hydrogen purge valve. Referring FIG. 6, a method for acceleratively activating a fuel cell according to another exemplary embodiment of the present invention is described below.

Figure 6:
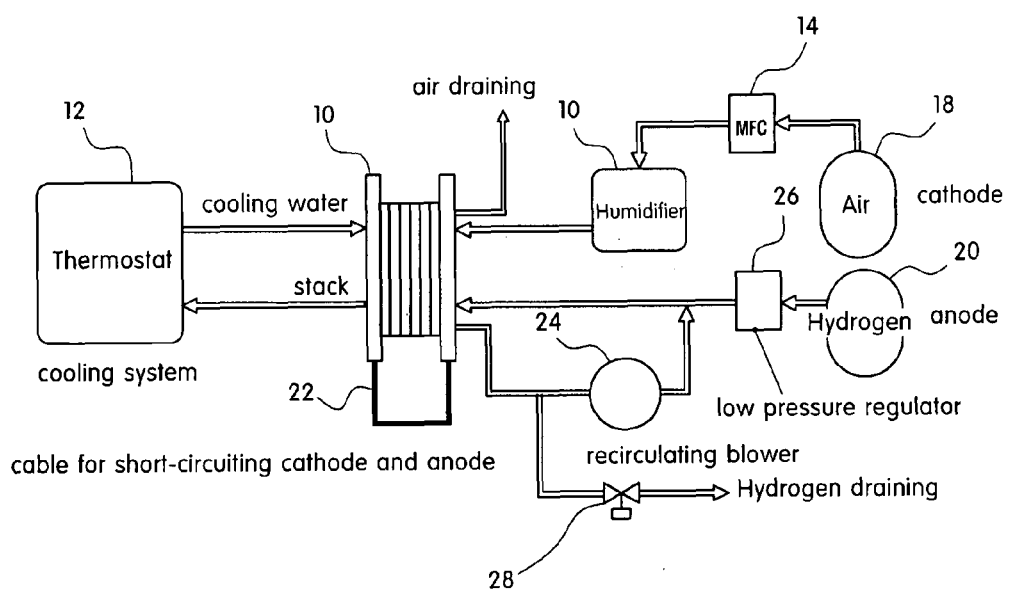
FIG. 6 is a block diagram illustrating a fuel cell activating apparatus according to another exemplary embodiment of the present invention.

Similarly to the apparatus described in FIG. 1, the apparatus of FIG. 6 comprises a cable 22 for short-circuiting a cathode and an anode of a stack 10 and a thermostat 12 coupled to the stack 10 as a cooling system for cooling the stack 10.

In this embodiment, however, an activation process is performed by using a recirculating blower 24 in order to reduce hydrogen usage as much as possible.

The recirculating blower 24 is coupled to a hydrogen outlet side to reuse hydrogen, whereby hydrogen usage of about 1.0 can be always maintained. With this configuration, a hydrogen mass flow controller 14 and a hydrogen humidifier 16 are not necessary.

Also, while the fuel cell is activated, water drained to the hydrogen outlet side is mixed with dry hydrogen gas by using the recirculating blower 24 and they are supplied to the stack 10. Therefore, there is no need for a separate humidifier. The dry hydrogen gas can be supplied through a pressure adjustment using a low pressure regulator 26.

In this embodiment, purely humidified air is first supplied to the stack 10 for about 5 minutes before accelerative activation using the hydrogen recirculating blower 24 for preventing the hydrogen side electrode from being damaged by generation of an electrical current in a state that a hydrogen side is dry at the initial activation stage.

The hydrogen side outlet needs to be periodically purged by using a hydrogen purge valve 28 to drain a large amount of water accumulated in a hydrogen channel.

Accelerated activation method used for this apparatus is performed in a manner similar to or same as that for the apparatus of FIG. 2, and a detailed description thereof is thus omitted.

Meanwhile, according to the present invention, after the activation process of the fuel cell stack is finished, it is necessary to remove the cable for short-circuiting the cathode and the anode of the stack.

That is, before the cable is removed, the flowing process is necessary to remove a high voltage of the stack caused by remaining gas.

At the final stage of the fuel cell accelerative activation process, hydrogen is constantly supplied at a minimum flow rate, and at the same time a supply of air is stopped. When each cell voltage has a voltage of less than 0.1 volt, a supply of hydrogen is stopped.

Therefore, since air side oxygen is removed at the final stage of the activation process, the cable can be safely removed while suppressing a corrosion possibility of an air side carbon support caused by forming of the hydrogen/oxygen interface.

The apparatuses and methods according to the present invention have the following advantages.

1) As the cathode and anode are directly short-circuited before reactant gas is supplied, the stack voltage is lowered to around 0 volt, and the electrolyte membrane and the catalyst layer can be rapidly activated.

2) A time for activating the fuel cell is reduced by a tenth (1/10) compared to the conventional activation method, whereby the stack throughput is improved.

3) A cooling calorific value of the stack coupling member itself can be used during activation of a small-sized/large-sized unit cell stack for the physical property evaluation, and thus a separate cooling system for maintaining the stack temperature during the activation is not necessary.

4) The activation process is performed in a state that the cathode and anode are short-circuited by the cable, and so expensive components can be replaced, leading to a low price activating apparatus.

5) When the hydrogen recirculating blower is used (i.e., when the hydrogen side mass flow controller and the hydrogen side humidifier which are high in price are not used), manufacturing cost can be further be reduced.

6) The hydrogen usage of the conventional method is 1.200 L/cell, whereas the hydrogen usage of the present method is 300 L/cell, meaning that the hydrogen usage can be reduced to less than a fourth (1/4) and stack manufacturing cost can thus be reduced.

7) When the hydrogen recirculating blower is used, the hydrogen usage can be further reduced to about a second (1/2), thereby significantly reducing a stack manufacturing cost.

8) Accordingly, the fuel call stack performance can be quickly and stably improved and overall performance of polymer electrolyte membrane fuel cell can also be significantly improved.

Although the present invention has been described with reference to certain exemplary embodiments thereof, it will be understood by those skilled in the art that a variety of modifications and variations may be made to the present invention without departing from the spirit or scope of the present invention defined in the appended claims, and their equivalents.

What is claimed is:

1. A method for acceleratively activating a fuel cell, comprising the steps of:
    (a) mounting a fuel cell stack onto an activating apparatus;
    (b) coupling a cable to both ends of the fuel cell stack to short-circuit a cathode and an anode;
    (c) supplying reactant gas while circulating cooling water to the fuel cell stack to thereby start to activate the fuel cell stack; and
    (d) adjusting a flow rate of the reactant gas supplied to the fuel cell stack, wherein the reactant gas is continuously supplied with a low flow rate and a high flow rate based on electrical current density.

2. The method of claim 1, wherein in the step (c), when the cathode and the anode are short-circuited by the cable, a current value of the cable and a maximum current value of the stack depend upon a flow rate of the reactant gas, wherein the reactant gas is either hydrogen, oxygen or both.

3. The method of claim 1, wherein in the step (c), when a stack voltage drops to a predetermined voltage, determining that a calorific value of the stack has reached its maximum value, and in response, supplying cooling water from a thermostat to the stack.

4. The method of claim 1, further comprising, in response to a voltage of a cell decreasing gradually and having a reverse voltage of lower than 0 volts lasting longer than a predetermined time period, adjusting a time for a low flow rate and a time for a high flow rate to reduce the time in which a reverse voltage is present in the cell to a time period which is shorter than or equal to the predetermined time.

5. The method of claim 1, further comprising, in response to a reverse voltage being generated by oxygen starvation after the activation of the fuel cell starts, adjusting a load while at the same time reducing an air flow rate to maintain a cell voltage of higher than 0 volts.

6. The method of claim 1, further comprising, subsequent to initiating activation of the fuel cell, mixing dry hydrogen gas and water before supplying the mixture to the fuel cell stack, the hydrogen supplied from a hydrogen supply means and the water drained to a hydrogen outlet side of the fuel cell stack by using a re-circulating blower.

7. The method of claim 1, further comprising, periodically draining water accumulated in a hydrogen channel of the fuel cell stack through a hydrogen purge valve.

* * * * *